UNITED STATES PATENT OFFICE 2,597,494

STRONGLY BASIC ANION-EXCHANGE POLYMERS OF VINYLANISOLE

Jesse C. H. Hwa, Philadelphia, Pa., assignor to Rohm & Haas Company, Philadelphia, Pa., a corporation of Delaware No Drawing. Application May 12, 1951, Serial No. 226,098

4 Claims. (Cl. 260—47)

This invention relates to anion-exchange polymers and to their preparation and use. It relates to insoluble anion-exchange resins of the strongly basic quaternary ammonium type which are proliferous polymers and which are characterized by unusually large areas of surface, very high degrees of porosity, high adsorptive capacity, and very rapid rates of adsorption. More specifically, it relates to the preparation and use of polymers which have the chemical properties of strongly basic anion-exchangers and the physical properties of the so-called popcorn or proliferous polymers. As a result of this peculiar combination of chemical and physical properties, these ion-exchange resins have distinct advantages in some applications over the harder and denser, strongly basic anion-exchangers employed heretofore. They are particularly suitable for use in catalysis, in the decolorization of cane sugar, and in selective adsorption, because of their strongly basic characteristics and their high porosity and large surface area.

Other anion-exchange resins of the strongly basic type are well known and are marketed for the deionization of aqueous fluids in general. Such resins as are being currently used are described in C. H. McBurney's application Serial No. 759,308, filed July 5, 1947, now Patent 2,591,573, issued February 29, 1952, and they are characterized by being hard, dense, infusible, insoluble, granular or spheroidal particles. As far as the chemical properties of these known resins and the chemistry of ion-exchange are concerned, the available products are very satisfactory. But the physical properties of these materials—particularly their hard, dense, granular form—limits their utility in many instances where their chemical properties would appear to make them ideally suited as, for example, in the de-ashing and decolorizing of cane sugar syrups.

The products of this invention are all insoluble, proliferous or popcorn polymers. They are water-insoluble, proliferous polymers of vinylanisole, to the aryl nuclei of which are attached quaternary ammonium groups. The ammonium groups are attached to the aromatic nuclei by means of alkylene groups—preferably by methylene groups. These polymers are made, as will be described in greater detail below, by haloalkylating—preferably chloromethylating—an insoluble, proliferous polymer or copolymer of vinylanisole—and then reacting the haloalkylated proliferous product with a tertiary amine such as trimethylamine or dimethylamino ethanol. As a result, the products are insoluble, proliferous polymers which are suitable for the removal of anions from fluids and which comprise the reaction product of a tertiary amine and a haloalkylated proliferous copolymer of a major portion of vinylanisole and a minor amount of a polyolefinic compound such as divinylbenzene or butadiene, in which the olefinic linkages are in the acyclic portion of the molecule and are the reaction groups which enter into the proliferous copolymerization reaction, the said proliferous copolymer containing at least one haloalkyl group for every fifteen aromatic nuclei—or preferably an average of about 0.2 to 1.5 haloalkyl groups—per aromatic nucleus. As a result, the proliferous products contain on the aromatic nuclei substituent groups having the general formula

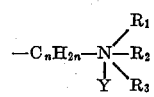

in which $n$ is an integer having a value of 1 to 4; $R_1$, $R_2$, and $R_3$ represent monovalent organic radicals; and Y is an anion.

The proliferous polymers of vinylanisole, from which the anion-exchange resins of this invention are made, are themselves prepared most conveniently by maintaining at a temperature from about 50° C. to 100° C.—and preferably from 60° C. to 80° C.—a mixture of vinylanisole and an auxiliary polyolefinic compound which is copolymerizable with the vinylanisole and in which the olefinic linkages are in the acyclic portion of the molecule and are the sole functional groups which take part in the copolymerization reaction. It is suggested that the copolymerization be carried out in a closed system where the amount of oxygen is negligible. It is even better to conduct the copolymerization in an inert atmosphere because oxygen exerts an inhibiting effect on the formation of the proliferous product. The addition of a small but catalytic amount of a previously prepared proliferous polymer is also recommended since it serves as a seed from which the proliferous polymer grows rapidly.

Proliferous polymers or copolymers of vinylanisole are believed to be new, although other kinds of proliferous polymers have been known for some time. Thus Kondakow (J. prakt. Chim. [2] 64, p. 109 (1901) ); Carothers (J. A. C. S. 53, p. 4203 (1931) ); Staudinger et al. (Berichte 68, p.1618 (1935) ); Britton (U. S. Pat. No. 2,341,175 of February 8, 1944); Kharasch et al. (Ind. Eng. Chem. 39, p. 830 (1947) ) and others have described various popcorn or proliferous polymers from other unsaturated, monomeric materials. Such popcorn polymers are distinct kinds of polymers and they have a community of physical properties. They are opaque, they have a sponge-like, porous structure, and they are insoluble in the very solvents which dissolve the homogeneous, thermoplastic polymers which are normally made from the same monomers. In most cases they look very much like popcorn and have been variously described as sponge-like, cauliflower-like, and coral-like. They have extremely high molecular weights and are apparently cross-linked to some extent. In addition, they are formed by an autocatalyzed polymerization and the characteristic way in which they form helps to identify them. In the process of preparing popcorn polymers the induction period may be long but once polymerization has started it proceeds rapidly until all or most of the monomer is consumed. It is characteristic of this type of polymerization that the polymer is insoluble in the monomeric material at all stages of the polymerization and that polymerization progresses in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer," is particularly apt—and is truly descriptive.

This invention relates primarily to the preparation of proliferous polymers of vinylanisole and to their conversion to anion-exchange resins which retain the physical properties of the proliferously polymerized vinylanisole from which they are made. This is not to say, however, that the conventional, non-proliferous, clear, cross-linked polymers of vinylanisole cannot also be converted to anion-exchange resins. They can be. But they do not give rise to resins with as large surface areas, or as rapid rates of adsorption, or as high capacities per unit of weight as are obtained from the proliferous polymers. As a matter of fact, some of the clear, non-proliferous polymer is frequently formed together with the proliferous polymer; and while this can be separated, it does not have to be, since it reacts chemically like the proliferous polymer and its presence merely dilutes, as it were, the advantages of the proliferous polymer.

In general, low temperatures favor the formation of proliferous polymers whereas higher temperatures favor the formation of the clear polymers. For this reason it is preferred that the polymerization of vinylanisole be carried out at temperatures from about 50° C. to 80° C. In this range the rate of formation of the proliferous polymer is fast enough to be practical while the formation of the clear, non-proliferous polymer is negligible—particularly in view of what was discussed above. At temperatures from 80° C to 100° C. the proportion of clear polymer increases at the expense of the proliferous product and above 100° C. the clear product forms to the complete exclusion of the proliferous resin.

A wide variety of polyolefinic compounds, as described above, definitely assist in the formation of the popcorn polymers of vinylanisole. The auxiliary compounds function as popping agents. Examples of some of the best auxiliary agents include divinylbenzene, isoprene, butadiene, bimethallyl, biallyl, trivinylbenzene, dicyclopentadiene, and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in U. S. Patents Nos. 2,311,615 and 2,341,175. The auxiliary compounds copolymerize with the vinylanisole and consequently are present in the final copolymeric products.

The most satisfactory and suggested amounts of auxiliary compounds are from 2% to 30%, based on the weight of this material and of the vinylanisole. The use of larger amounts has been studied but there does not appear to be any advantage in exceeding 30%—or even 20%—particularly when the ion-adsorbing capacity of the final product is considered. While all of the auxiliary compounds are alike in having a plurality of non-benzenoid, olefinic linkages or double bonds in their chemical structure, and in facilitating the popping of vinylanisole, it is also true that these compounds differ in degree in regard to the effect they have on the density and porosity of the final copolymer. For example, divinylbenzene, which is recognized as a particularly fast and efficient cross-linking agent for vinyl compounds in general, aids very materially in the popping of vinylanisole, but it also gives rise to harder, less porous popcorn polymers than do many of the other auxiliary agents such as butadiene or isoprene. Consequently the amount, within the limits set forth above, of the auxiliary copolymerizable compound which is employed is determined by the degree of porosity or extent of surface-area which is desired in the final product.

The use of a seed to promote the proliferous polymerization is not necessary but is most desirable. The material which is used as a seed can have the same chemical composition as the proliferous polymer which it is desired to make or it can have a different chemical composition. A convenient method involves adding a small amount of a previous batch of proliferous polymer to subsequent mixtures of monomeric material which are to be popped. Even the quantities of one batch which may adhere to the equivalent serve to seed subsequent batches. The word "seed" is used herein in the accepted chemical sense and itself indicates that the amount required is very small and that the material is insoluble in the reaction mixture. As little as about 0.001%, on a weight basis, is adequate.

Vinylanisole can be made to polymerize proliferously in bulk or in solution or while suspended in an immiscible liquid medium. The advantage of carrying out the polymerization by the suspension technique is that the final product is obtained in the form of discrete particles which adsorb ions unusually rapidly and which, although small, possess the advantageous properties of popcorn polymers such as porosity, high surface area, and rapid rates of adsorption.

It appears that free radicals, such as are provided by peroxidic compounds, play a part in the formation of the opaque, proliferous polymers, just as they do in the formation of clear, glass-like polymers. In proliferous polymerization, however, the amount of the peroxidic compounds, such as benzoyl, lauroyl, stearoyl peroxides, tert.-butyl hydroperoxide and the inorganic per-salts, which can be tolerated is relatively very low and should not exceed 0.5% on a weight basis because large amounts of such compounds favor the formation of the clear, glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus, it is most desirable to conduct the proliferous polymerization in the substantially complete absence of oxygen.

The proliferous polymers and copolymers of vinylanisole, regardless of their origin or particular method of preparation, are first haloalkylated and then reacted with a tertiary amine. This step of haloalkylating involves introducing into a proliferous polymer a plurality of bromoalkyl or chloroalkyl groups having the general formula $C_nH_{2n}X$, in which $n$ is an integer of value one to four and X represents an atom of chlorine or bromine. While groups containing one to four carbon atoms are embraced by this invention, it is preferred to employ those compounds in which chloromethyl groups, $-CH_2Cl$, are added to the insoluble polymer because the chloromethyl products are by far the most reactive. The carbon atoms in the group $-C_nH_{2n}X$ may be in a straight or a branched chain.

The step of haloalkylating the insoluble copolymer may be carried out in a variety of ways. For example, the polymer may be reacted with a mixture of an aldehyde and hydrochloric acid or a mixture of a dihalide and a Friedel-Crafts catalyst. Methods of chloroalkylating which may be used for introducing the $-CH_2Cl$ group and which also serve as guides for introducing $-C_2H_4X$, $-C_3H_6X$, and $-C_4H_8X$ groups are described in "Organic Reactions," vol. I, chapter 3, page 63 et seq. (John Wiley & Sons, Inc., N. Y. C., 1942).

The extent of the haloalkylation reaction may be conveniently determined by a halogen analysis. It is desirable that as many haloalkyl groups as possible be introduced into the insoluble copolymer because the number of such groups determines the number of quaternary ammonium groups in the final product; and, of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity as to be commercially attractive. The minimum number of such groups should be one for every 15 aromatic hydrocarbon nuclei in the polymer. This, of course, requires that at least one haloalkyl group be first added for every 15 aromatic hydrocarbon nuclei. The upper limit is that reached when every available position in the aromatic nuclei is haloalkylated. Satisfactory resins of high capacity can be made in which the number of haloalkyl groups and, hence, the number of quaternary ammonium groups which are introduced is less than the theoretical maximum. Thus, very valuable resins are those made by aminating, with a tertiary amine, copolymers containing from 3 to 6 haloalkyl groups for every four aromatic hydrocarbon nuclei.

The next step in the formation of the anion-exchange resin is the amination of the haloalkylated copolymer with a tertiary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing quaternary ammonium salt groups, is freed of the liquid.

It has been found to be advantageous to swell the haloalkylated polymer prior to its reaction with the tertiary amine. This swelling facilitates the subsequent amination reaction and may be carried out by soaking the polymer in a suitable liquid, the most satisfactory of which are benzene, toluene, ethylene dichloride, trichloroethane, tetrachloroethane and the like.

The tertiary amine is used in the form of the free base. Best results are obtained when the amine is one having the general formula

in which $R_1$, $R_2$, and $R_3$ represent methyl, ethyl, phenyl, benzyl, propynyl, or beta-hydroxyethyl groups typified by trimethylamine, triethylamine, dimethylbenzylamine, dimethylaminoethanol, dimethylaniline, and dimethylaminopropyne. Other amines, such as tributylamine and N-methylmorpholine, are operable also; but the products are somewhat less stable than those made with amines containing the six substituents listed above.

After the amination is complete, the resins are separated from the liquids and are freed of organic liquids by steam-distillation. As ordinarily prepared, the products are in the form of quaternary ammonium salts; but such salts can be readily converted into quaternary ammonium hydroxides by treatment with an aqueous solution of a hydroxide of an alkali metal.

The following examples, in which all parts are by weight, are presented in order that the preparation and properties of the products of this invention may be thoroughly understood and recognized. The examples are not to be taken, however, as limiting this invention.

EXAMPLE 1

This serves to show how monomeric vinylanisole can be conveniently converted into proliferous or popcorn polymers. In each case a glass tube was partially filled with the mixture of vinylanisole to be popped. A small piece—a seed—of a previously prepared proliferous copolymer of approximately 90% vinylanisole and 10% isoprene was added. The mixtures contained a major portion of vinylanisole and a minor portion of a polyolefinic, auxiliary compound as a popping agent which was known to be copolymerizable with the vinylanisole. Nitrogen was bubbled through the mixtures in order to flush oxygen from the tubes and thereafter the tubes were sealed with foil-lined caps and were placed in a constant-temperature water-bath. The kinds and amounts of the auxiliary popping agents which copolymerized proliferously with the vinylanisole are listed below in Table I together with other pertinent data. The percentages of the components of the mixture are based on the total weight of the copolymerizable mixtures. An induction period, as recorded, is that length of time during which no visible change takes place in the monomeric mixture and is followed by a period of propagation during which the polymer is formed on the seed by proliferation. Ordinarily, the induction period is several times as long as the period of propagation.

*Table I*

| Auxiliary Compound | Benzoyl Peroxide | Temperature | Induction Period |
|---|---|---|---|
| | Per cent | °C. | |
| 10% Butadiene | 0 | 65 | About 1 day. |
| Do | 0.1 | 50 | 1 to 2 days. |
| 20% Butadiene | 0 | 65 | About 1 day. |
| 10% Isoprene | 0 | 65 | About 3 days. |
| 6% Commercial Divinylbenzene.[1] | 0.05 | 65 | 1 to 2 days. |
| 10% Butadiene and 6% Commercial Divinylbenzene.[1] | 0.05 | 65 | About 1 day. |

[1] The commercial divinylbenzene contained approximately 44% divinylbenzene and 56% ethylstyrene.

EXAMPLE 2

A proliferous copolymer of 90% vinylanisole and 10% butadiene was chloromethylated as follows: 23.3 parts (equivalent to 0.15 mole of polymerized vinylanisole) of the copolymer (the first described in Example 1 above) was soaked in 370 parts of ethylene dichloride for one hour, during which time the polymer swelled markedly. To the mixture contained in a 3-necked flask equipped with stirrer, thermometer, and reflux condenser was added 36 parts (0.45 mole) of chloromethyl ether, $CH_2ClOCH_3$, and this mixture was stirred at room temperature for one and one-half hours. Then 60 parts (0.45 mole) of anhydrous aluminum chloride was added slowly while the mixture was maintained at a temperature of 20°–30° C. by means of external cooling. The mixture was stirred and maintained at room temperature overnight. Thereafter 600 parts of water was added and the resultant mixture was stirred for one hour. The resin was filtered off and was thoroughly washed with water, after which it was dried in an oven overnight at 65° C. Analysis showed that the product contained 8.1% chlorine (corresponding to a product in which 81% of the aromatic nuclei were chloromethylated). Inspection revealed that this chloromethylated material was still in the form of a popcorn or proliferous polymer.

EXAMPLE 3

The chloromethylated proliferous product of Example 2 above was converted into a quaternary ammonium anion-exchange resin as follows: In a 3-necked flask equipped with stirrer, thermometer, and reflux condenser were mixed 50 parts of ethylene dichloride and eight parts of the dry chloromethylated product of Example 2. The mixture was stirred for an hour during which time the polymer swelled. Then 100 parts of water was added and the swollen polymer was dispersed therein by means of vigorous agitation. A total of 7.1 parts of dimethylamino ethanol, $(CH_3)_2N—C_2H_4OH$, was added and the mixture was stirred and heated to refluxing temperature, at which point it was held for 2.5 hours. The mixture was then freed of ethylene dichloride by steam distillation. It was filtered and the resin was washed thoroughly with water and then dried in an oven at 65° C. Analysis showed that over 40% of the available chloromethyl groups had been aminated. The product had a total anion-exchange capacity of 0.74 milliequivalent per gram of dry resin and was a typical popcorn polymer.

EXAMPLE 4

By the procedure of Example 3, 19 parts of a chloromethylated proliferous polymer (prepared by the process set forth in Examples 1 and 2 above) was stirred and reacted with 5 parts of trimethylamine for 16 hours. The product was freed of ethylene dichloride by steam distillation and was filtered, washed and dried. It was found to have a capacity of 1.4 milliequivalents per gram.

The products of this invention are all members of that class of compounds known as strongly basic, quaternary ammonium, anion-exchange resins. As such, they can be used in the form of the hydroxide or in the form of quaternary ammonium salts. Not only are these resins capable of adsorbing free acid from fluids but they are capable of exchanging anions. Thus, the salt form is converted to the hydroxide form by treatment with an excess of solution of a strong base such as sodium or potassium hydroxide or, conversely, the hydroxide form is converted to the salt form by treatment with an excess of a solution of an acid such as hydrochloric acid or of a salt such as sodium chloride.

Weakly basic anion-exchange resins of the proliferous type which are quite different in their behavior can also be made by aminating a haloalkylated proliferous copolymer of vinylanisole by means of a primary or secondary amine according to the process described in my application Serial No. 226,097, filed May 12, 1951.

I claim:

1. As a new composition of matter, an opaque, infusible, proliferous polymer containing at least 70% proliferously polymerized vinylanisole to the aromatic nuclei of which are attached substituent groups having the general formula

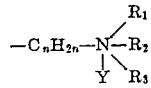

in which $n$ is an integer of value one to four; $R_1$, $R_2$, and $R_3$ are members of the class consisting of methyl, ethyl, phenyl, benzyl, propynyl, and beta-hydroxyethyl groups; and $Y$ is an anion; the number of said substituent groups being at least one for every fifteen aromatic nuclei in said polymer, said polymer being capable of removing anions from fluids.

2. As a new composition of matter, an opaque, infusible, proliferous copolymer of a mixture of (a) 70% to 99.5% vinylanisole and (b) 30% to 0.5% of a polyolefinic, organic compound which is copolymerizable with vinylanisole and in which the olefinic linkages are in the acyclic portion of the molecule and are the reactive groups which enter into the proliferous copolymerization reaction, said proliferous copolymer containing on the aromatic nuclei thereof substituent groups having the general formula

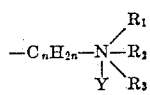

in which $n$ is an integer of value one to four; $R_1$, $R_2$, and $R_3$ are members of the class consisting of methyl, ethyl, phenyl, benzyl, propynyl, and beta-hydroxethyl groups; and $Y$ is an anion; the number of said substituent groups being at least one for every fifteen aromatic nuclei in said copolymer, said copolymer being capable of removing anions from fluids.

3. As a new composition of matter, an opaque, infusible, proliferous copolymer of a mixture of (a) 70% to 99.5% vinylanisole and (b) 30% to 0.5% of a polyolefinic, organic compound which is copolymerizable with vinylanisole and in which the olefinic linkages are in the acyclic portion of the molecule and are the reactive groups which enter into the proliferous copolymerization reaction, said proliferous copolymer containing on the aromatic nuclei thereof substituent groups having the general formula

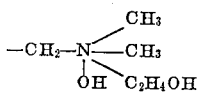

the number of said substituent groups being at least one for every fifteen aromatic nuclei in said copolymer, said copolymer being capable of removing anions from fluids.

4. As a new composition of matter, an opaque, infusible, proliferous copolymer of a mixture of (a) 70% to 99.5% vinylanisole and (b) 30% to 0.5% of a polyolefinic, organic compound which is copolymerizable with vinylanisole and in which the olefinic linkages are in the acyclic portion of the molecule and are the reactive groups which enter into the proliferous copolymerization reaction, said proliferous copolymer containing on the aromatic nuclei thereof substituent groups having the general formula

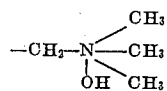

the number of said substituent groups being at least one for every fifteen aromatic nuclei in said copolymer, said copolymer being capable of removing anions from fluids.

JESSE C. H. HWA.

No references cited.